(12) United States Patent
Sauvage et al.

(10) Patent No.: US 8,721,204 B2
(45) Date of Patent: May 13, 2014

(54) CURVED KEYBOARD WITH WAVE-SHAPED KEY HEIGHT VARIATION TO ACCOMMODATE NATURAL FINGER POSITIONS

(75) Inventors: Sylvain Sauvage, Lausanne (CH);
Lorenzo Mandelli, Lausanne (CH);
Eugene Canavan, Bray (IE); Cathal Loughnane, Wexford (IE)

(73) Assignee: Logitech Europe S.A., Morges (CH)

( * ) Notice: Subject to any disclaimer, the term of this patent is extended or adjusted under 35 U.S.C. 154(b) by 58 days.

(21) Appl. No.: 11/567,466

(22) Filed: Dec. 6, 2006

(65) Prior Publication Data

US 2008/0138136 A1    Jun. 12, 2008

(51) Int. Cl.
*B41J 5/00*      (2006.01)
(52) U.S. Cl.
USPC .............................. 400/488; 400/489; 400/490
(58) Field of Classification Search
USPC .............. 400/472, 488, 489, 490, 491, 491.3, 400/492, 486
See application file for complete search history.

(56) References Cited

U.S. PATENT DOCUMENTS

| 1,468,566 | A |   | 2/1923  | Hall |  |
|-----------|---|---|---------|------|--|
| 3,929,216 | A |   | 12/1975 | Einbinder | |
| 3,945,482 | A | * | 3/1976  | Einbinder | 400/486 |
| 4,597,681 | A | * | 7/1986  | Hodges | 400/488 |
| 4,690,645 | A |   | 9/1987  | Ukisu |  |
| 5,391,006 | A | * | 2/1995  | Danziger | 400/488 |
| 5,397,189 | A |   | 3/1995  | Minogue |  |
| 5,689,253 | A | * | 11/1997 | Hargreaves et al. | 341/22 |
| 5,739,776 | A | * | 4/1998  | Chen | 341/22 |
| 5,899,616 | A | * | 5/1999  | Caplan | 400/489 |
| 6,183,149 | B1|   | 2/2001  | Caplan |  |
| 7,182,533 | B1| * | 2/2007  | Caplan | 400/489 |
| 2003/0068183 | A1 | * | 4/2003 | Sabato | 400/472 |
| 2005/0063760 | A1 | * | 3/2005 | Camacho et al. | 400/472 |
| 2006/0275069 | A1 | * | 12/2006 | Jones et al. | 400/490 |
| 2008/0024327 | A1 | * | 1/2008 | Downs et al. | 341/22 |

FOREIGN PATENT DOCUMENTS

| CN | 1276758 A | 12/2000 |
| DE | 3614745 A1 | 3/1987 |
| DE | 29706281 U1 | 8/1997 |

OTHER PUBLICATIONS

Kevin Reynolds, Logitech Cordless Desktop LX 300 & 501, Aug. 16, 2004, Hardware Pacers, pp. 1-3.*
Elektronik, 1993, pp. 44.

* cited by examiner

*Primary Examiner* — David Banh
(74) *Attorney, Agent, or Firm* — Kilpatrick Townsend & Stockton LLP

(57) ABSTRACT

A keyboard having improvements to the combination wave and curve keyboards of the prior art. In one embodiment, the invention provides a wave shape on a keyboard palm rest. In another embodiment, the invention provides a unique combination of a QWERTY keyboard, with both a wave and a curve, where the D and K keys are the low points of the wave. In another embodiment, a combination of more than one lateral waves and a constant radius curve is provided. Yet another embodiment provides the combination of a curved keyboard and a straight number pad.

17 Claims, 2 Drawing Sheets

CURVED KEYBOARD WITH WAVE-SHAPED KEY HEIGHT VARIATION TO ACCOMMODATE NATURAL FINGER POSITIONS

BACKGROUND OF THE INVENTION

The present invention relates to computer keyboards, and in particular to keyboards having curved shapes and vertical variations.

A number of patents illustrate keyboards that are curved, or which have vertical variations (a wave shape). Hall U.S. Pat. No. 1,466,568, filed Sep. 8, 1922, shows a QWERTY typewriter with a wave shape. Einbinder U.S. Pat. No. 3,945,482 shows a non-QWERTY wave, split keyboard. A keyboard having both a wave and a curve is shown in Hodges U.S. Pat. No. 4,597,681. A keyboard having a curve with a single wave is shown in Minogue U.S. Pat. No. 5,397,189. A keyboard with a wave having the S key as the low point is shown in Danziger U.S. Pat. No. 5,391,006.

BRIEF SUMMARY OF THE INVENTION

The present invention provides a keyboard having improvements to the combination wave and curve keyboards of the prior art. In one embodiment, the invention provides a wave shape on a keyboard palm rest.

In another embodiment, the invention provides a unique combination of a QWERTY keyboard, with both a wave and a curve, where the D and K keys are the low points of the wave. In another embodiment, a combination of more than one lateral waves and a constant radius curve is provided. Yet another embodiment provides the combination of a curved keyboard and a straight number pad.

In another embodiment, the keyboard has a wave and curve, but no tilt, and is combined with a tilted media panel. The tilted media panel also has a wave.

DETAILED DESCRIPTION OF THE INVENTION

Figure 1:
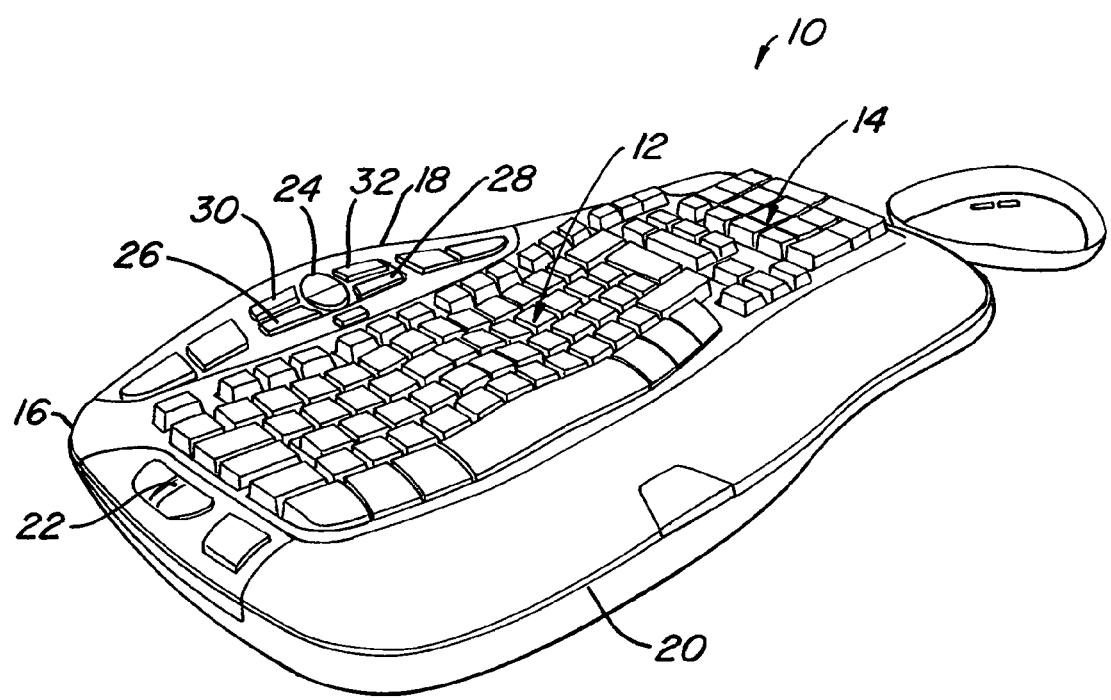
FIG. 1 is a perspective view of an embodiment of a keyboard according to the present invention.

FIG. 1 is a perspective view of an embodiment of a keyboard 10 according to the present invention. The keyboard has a QWERTY group of keys 12 and a number pad 14, mounted on a frame 16. A media panel 18 is attached to a top of the keyboard, and a palm rest 20 is attached to the bottom. Additional controls, including a zoom rocker switch 22, are mounted adjacent the left side of the keyboard.

Figure 2:
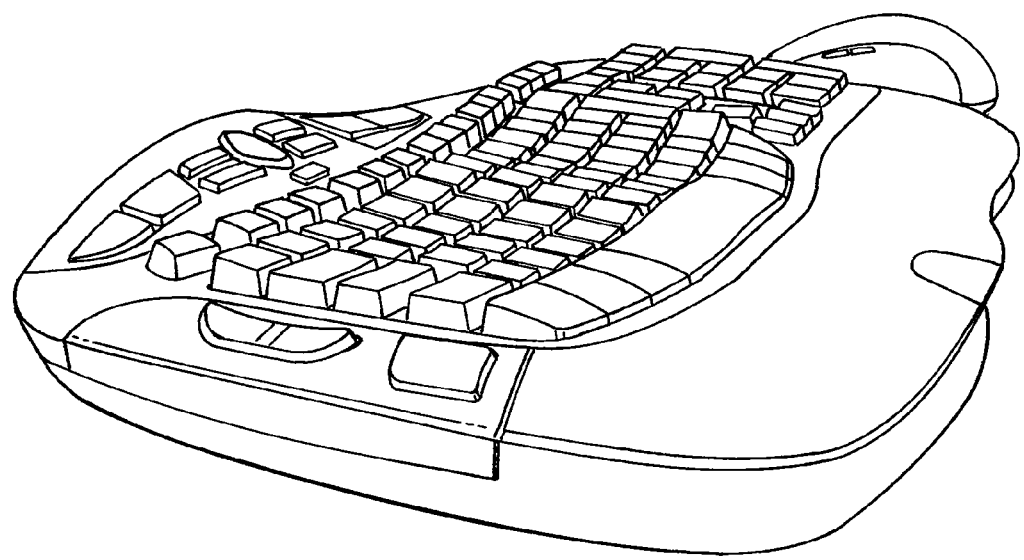
FIG. 2 is a side view of the embodiment of FIG. 1.

FIG. 2 is a side view of the embodiment of FIG. 1. As can be seen more clearly in FIG. 2, the keyboard QWERTY section has a lateral wave, with the high point of the wave between the G and H keys, which are of equal height. The space bar has a high point in the middle. The peak of the wave slants slightly to the left, with the Y key being the highest in the next row, with the T key slightly lower. The 6 key is the highest in the back row, and the B key is the highest in the front row. The peak of the space bar is directly in front of the B key. The space bar peaks at the same height as the B key.

Figure 3:
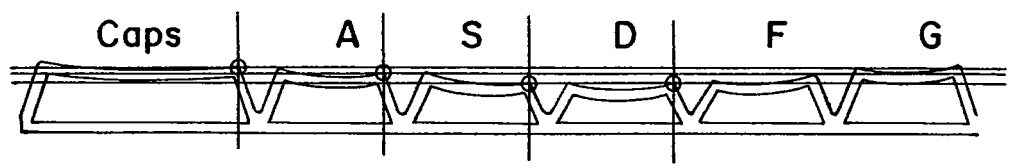
FIG. 3 is a cut-away view showing the key heights and shapes on one side of the keyboard of the embodiment of FIG. 1.

FIG. 3 is a cut-away view showing the key heights and shapes on one side of the keyboard of the embodiment of FIG. 1. As can be seen, the D key is lowest. The key tops have a concave surface. For the D key, the concave surface is symmetrical, with both sides being of equal height. For the other keys, the height of the keys varies from on side to another, so that the wave is not simply curving from one key to the next, but within the individual keys. The other side of the keyboard row, from the H key through the Enter key, is the mirror image of what is shown in FIG. 3.

Number pad 14 has a concave wave, with the center key 5 being the bottom of the wave, or trough. The remaining keys of the number pad are higher, both side to side and front to back. This configuration fits the natural placement of the right hand over the number pad. Although the right hand is usually angled inward on the QWERTY keys, when it is moved to the right, it will be oriented straight. The concave wave fits the difference in finger lengths, just like the right and left concave waves in the QWERTY key section, as described above.

The wave shape adapts to the natural position of a user's hand. In the typing position, the user has the small, or pinky, finger over the A key, the ring finger over the S key, the index finger over the F key, and the forefinger over the D key. The middle finger is the longest, and thus the D key is made the lowest. The variation for most people is approximately 4 mm, and accordingly this is the difference in height between the highest and lowest keys in one embodiment.

As in the prior art, the curve shape allows the hands to be in a more natural position, angled inward toward the center of the keyboard, reducing Ulnar Deviation. The palm rest follows this curve in one embodiment, and includes a wave as well. The palm rest wave supports the hands in this natural position, and reduces Forearm Protrusion.

In one embodiment, the media panel includes Volume rocker switch (Up and Down) 24, and is surrounded by a Stop button 26, a Play/Pause button 28, a Next/Fast Forward button 30 and a Previous/Rewind button 32.

Each key is tailored both to have the desired height and side to side variation in height, but also to have a desired size so that the curve of the keyboard is provided without have longer keys in the middle, as in many prior art designs. Rows A, B, C, and D (from the front of the keyboard toward the back) have no tilt angle (they are flat). Row E has a positive tilt of a few degrees (the tilt ramps up to the media panel).

The BackSpace key is 2 mm bigger so that the key on its left is 2 mm smaller. The Backspace key is the only key (except the Function keys) that is convex—all other keys are concave with a radius of 30 mm. The concavity is an answer to the pinky finger stroke angle, so that the finger hits the surface at 90°.

It will be understood that modifications and variations may be effected without departing from the scope of the novel concepts of the present invention. For example, the features described could be combined in different ways. The curved keyboard QWERTY rows and straight number pad rows could be combined without the wave. The media panel cold be left off, or could be flat without a wave. Accordingly, the foregoing description is intended to be illustrative, but not limiting, of the scope of the invention which is set forth in the following claims.

What is claimed is:
1. A computer keyboard apparatus comprising:
   a keyboard having a top housing including a front portion and a rear portion, the top housing including:
      a plurality of rows of letter keys in a QWERTY key arrangement;

a row of number keys disposed above the plurality of rows of letter keys;

a row of function keys disposed above the row of number keys, wherein the QWERTY keys and number keys varying in height along a plurality of said rows to provide a dual wave shape to said keyboard, wherein the letter keys A-S-D-F-G form a first wave, and the letter keys H-J-K-L form a second wave, wherein the plurality of rows of QWERTY keys on said keyboard are curved horizontally, such that a middle portion of said rows is closer to the front portion of the top housing than the ends of said rows, and the ends of said rows are closer to the rear portion of the top housing than the middle portion of said rows, wherein the row of number keys are curved horizontally, such that a middle portion of the row of number keys is closer to the front portion of the top housing than either end of the row of number keys, wherein the row of function keys are curved horizontally, such that a middle portion of the row of function keys is closer to the front portion of the top housing than either end of the row of function keys, wherein the letter keys have concave tops, with the D and K keys being symmetrical, with a plurality of keys on either side of the D and K keys have a height which varies from one side to another, so that the key tops are not symmetrical, and are angled in the same direction as the wave, wherein each row of QWERTY keys and number keys have a substantially uniform separation between each key along that particular row, wherein a highest point in the wave is between the G and H keys in one row, and is the Y key in another row, wherein the letter keys and number keys have a front portion and a back portion, wherein the letter keys are not tilted from front portion-to-back portion (front-to back), such that the housing is flat at the rows with the letter keys, and wherein a top of each of the number keys includes a positive tilt from front-to-back;

a media panel tilted with respect to said QWERTY keys;

a zoom rocker switch mounted proximate an edge of said keyboard; and a number pad with straight rows, the keys of said number pad forming a wave.

2. The computer keyboard apparatus of claim 1 further comprising:

a wrist support varying in height to provide a wave shape which follows the wave shape of said plurality of rows.

3. The keyboard apparatus of claim 1 wherein the D and K keys are the low points of the wave and further comprising a 4 mm difference between a highest point in a split line between keys G and H and lowest keys D and K.

4. The computer keyboard apparatus of claim 1 further comprising:

said QWERTY keys being arranged in a curve along the rows of said keys having a constant radius.

5. The computer keyboard apparatus of claim 1 wherein all of said letter keys have the same size so that said curve is achieved with a constant gap between said letter keys and without some of said letter keys being larger than other letter keys.

6. A computer keyboard apparatus comprising:

a keyboard having a top housing including a front portion and a rear portion, the top housing including:

a plurality of rows of letter keys in a QWERTY key arrangement;

a row of number keys disposed above the QWERTY keys;

a row of function keys disposed above the number keys, wherein the letter keys of said QWERTY key arrangement vary in height along a plurality of said rows to provide a dual vertical wave shape to said keyboard, with D and K keys being low points of the wave, wherein letter keys A-S-D-F-G form a first wave, and letter keys H-J-K-L form a second wave, wherein the plurality of rows of letter keys of said keyboard are curved horizontally, such that a middle portion of said rows is closer to the front portion of the top housing than the ends of said rows, and the ends of said rows are closer to the rear portion of the top housing than the middle portion of said rows, wherein the row of number keys are curved horizontally, such that a middle portion of the row of number keys is closer to the front portion of the top housing than either end of the row of number keys, and the ends of said rows are closer to the rear portion of the top housing than the middle portion of said rows, wherein the row of function keys are curved horizontally, such that a middle portion of the row of function keys is closer to the front portion of the top housing than either end of the row of function keys, wherein the letter keys have concave tops, with the D and K keys being symmetrical, with a plurality of keys on either side of the D and K keys have a height which varies from one side to another, so that the key tops are not symmetrical, and are angled in the same direction as the wave, and wherein each row of letter keys and number keys have a substantially uniform separation between each key along that particular row;

a wrist support varying in height to provide a wave shape which follows the wave shape of said plurality of rows, wherein the letter keys being arranged in a curve having a constant radius; and a number pad with straight rows, the keys of said number pad forming a wave in the shape of a trough, with a center key 5 being located at the bottom of the trough, wherein the letter keys and number keys include a front portion and a back portion, wherein said letter keys are not tilted from front portion-to-back portion (front-to-back), such that the housing is flat at the rows with the letter keys, wherein a top of each of the number keys includes a positive tilt from front-to-back, and wherein all of said letter keys have the same size so that said curve is achieved with a constant gap between said letter keys and without some of said letter keys being larger than other letter keys.

7. The computer keyboard apparatus of claim 6 further comprising:

a media panel tilted with respect to said QWERTY keys.

8. The keyboard apparatus of claim 7 wherein said media panel has a wave shape.

9. The keyboard apparatus of claim 7 further comprising:

a zoom rocker switch mounted proximate an edge of said keyboard.

10. The computer keyboard apparatus of claim 7 wherein said media panel comprises:

a volume knob; and stop, play, fast forward and fast rewind keys around said volume knob.

11. A computer keyboard apparatus comprising:
a keyboard housing comprising including a front side and a back side, the keyboard housing including:
a plurality of rows of letter keys disposed in the keyboard housing;
a row of number keys disposed above the plurality of rows of letter keys in the keyboard housing; and
a row of function keys disposed above the row of number keys in the keyboard housing, wherein each of the plurality of rows of letter keys, the row of number keys, and the row of function keys includes a left-most key, a middle portion, and a right-most key,
wherein each of the rows of letter keys, the row of number keys, and the row of function keys are disposed along a horizontal wave lying in a horizontal plane such that the middle portion is closer to the front side of the keyboard housing than the left-most key and the right most key, and the left-most key and the right-most key are closer to the back side of the keyboard housing than the middle portion,
wherein each row of letter keys and number keys have a substantially uniform separation between each key along that particular row,
wherein the letter keys and number keys include a front portion and a back portion, wherein said letter keys are not tilted from front portion-to-back portion (front-to-back), such that the housing is flat at the rows with the letter keys,
wherein a top of each of the number keys includes a positive tilt from front-to-back;
wherein the plurality of rows of letter keys vary in height such that they form a vertical dual wave comprising a first peak, a second peak, and a third peak, and
wherein the first peak of the vertical dual wave is formed by the left-most key, the second peak of the vertical dual wave is formed by the middle portion, and the third peak of the vertical dual wave is formed by the right most key; and
a number pad with a plurality of straight rows of number pad keys.

12. The computer keyboard apparatus of claim 11, wherein the wave formed by the number pad keys is substantially continuous with the vertical dual wave formed by the plurality of rows of letter keys.

13. The computer keyboard apparatus of claim 11 wherein the letter keys have concave tops and are angled in the same direction as the vertical dual wave.

14. The computer keyboard apparatus of claim 11 further comprising a zoom rocker switch mounted proximate to an edge of the keyboard housing.

15. The computer keyboard apparatus of claim 11 further comprising a media panel, wherein the media panel has a wave shape.

16. The computer keyboard apparatus of claim 15 wherein the media panel comprises:
a volume knob; and
stop, play, fast forward and fast rewind keys around said volume knob.

17. The computer keyboard of claim 11 wherein the letter keys are concave with a radius of 30 mm.

* * * * *